United States Patent
Wang

(10) Patent No.: US 11,079,817 B2
(45) Date of Patent: Aug. 3, 2021

(54) ELECTRONIC DEVICE AND METHOD OF STARTING THE SAME

(71) Applicant: GETAC TECHNOLOGY CORPORATION, Hsinchu County (TW)

(72) Inventor: Chen-Ping Wang, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 309 days.

(21) Appl. No.: 16/023,101

(22) Filed: Jun. 29, 2018

(65) Prior Publication Data
US 2019/0121954 A1   Apr. 25, 2019

(30) Foreign Application Priority Data
Oct. 20, 2017   (CN) .......................... 201710982574.7

(51) Int. Cl.
| | | |
|---|---|---|
| *G06F 21/35* | (2013.01) | |
| *G06F 1/20* | (2006.01) | |
| *G06F 1/324* | (2019.01) | |
| *F04D 27/00* | (2006.01) | |
| *F04D 25/06* | (2006.01) | |

(52) U.S. Cl.
CPC ............. *G06F 1/206* (2013.01); *G06F 1/20* (2013.01); *G06F 1/203* (2013.01); *G06F 1/324* (2013.01); *G06F 21/35* (2013.01); *F04D 25/0613* (2013.01); *F04D 27/004* (2013.01); *G06F 2221/2139* (2013.01); *G06F 2221/2153* (2013.01)

(58) Field of Classification Search
CPC . G06F 1/206; G06F 1/20; G06F 1/203; G06F 21/35; G06F 1/324; G06F 2221/2153; G06F 2221/2139
See application file for complete search history.

(56) References Cited

U.S. PATENT DOCUMENTS

| | | | | |
|---|---|---|---|---|
| 9,247,425 | B2* | 1/2016 | Nousiainen | H04W 12/068 |
| 9,823,631 | B1* | 11/2017 | Loo | G05B 15/02 |
| 10,231,128 | B1* | 3/2019 | Ziraknejad | H04L 9/0825 |
| 2004/0073792 | A1* | 4/2004 | Noble | G06F 21/35 |
| | | | | 713/168 |
| 2006/0265755 | A1* | 11/2006 | Liu | G06F 21/81 |
| | | | | 726/26 |
| 2007/0096870 | A1* | 5/2007 | Fisher | G07C 9/257 |
| | | | | 340/5.53 |
| 2013/0297711 | A1* | 11/2013 | Nhu | G06F 15/163 |
| | | | | 709/206 |

(Continued)

*Primary Examiner* — Farid Homayounmehr
*Assistant Examiner* — Suman Debnath

(57) ABSTRACT

A method of starting an electronic device includes: receiving a first wireless signal carrying a first identification data by a wireless receiver before the electronic device enters a normal operating state; comparing the first identification data with a valid data; obtaining an account name and a password according to the first identification data if the first identification data matches the valid data and logging in to an operating system with the account name and the password so as to allow the electronic device to enter the normal operating state; and not logging in to the operating system if the first identification data does not match the valid data.

17 Claims, 4 Drawing Sheets

(56) References Cited

U.S. PATENT DOCUMENTS

| | | | | |
|---|---|---|---|---|
| 2014/0282981 A1* | 9/2014 | Satpathy | .............. | H04L 67/104 726/8 |
| 2016/0012196 A1* | 1/2016 | Mark | .................... | G16H 40/63 705/2 |
| 2016/0378992 A1* | 12/2016 | Nguyen | ............... | H04W 12/06 726/19 |

* cited by examiner

ELECTRONIC DEVICE AND METHOD OF STARTING THE SAME

CROSS-REFERENCE TO RELATED APPLICATIONS

This application claims priority from China Patent Application No. 201710982574.7, filed on Oct. 20, 2017, the entire disclosure of which is hereby incorporated by reference.

BACKGROUND OF THE INVENTION

Field of the Invention

The present invention relates to information security and management methods and, more particularly, to an electronic device and a method of starting the same.

Description of the Prior Art

Owing to technological advancements, electronic devices are indispensable to daily life. To prevent unauthorized access to data stored in electronic devices, operating systems of the electronic devices have a password setting function whereby users enter passwords required for the electronic devices to log in to the operating systems, i.e., enter a user mode, such that the users can operate the electronic devices in the user mode. However, to start the electronic devices or wake up the standby electronic devices, the users have to enter passwords again in order for the electronic devices to log in to the operating systems.

SUMMARY OF THE INVENTION

In an embodiment, a method of starting an electronic device comprises the steps of: receiving a first wireless signal carrying a first identification data by a wireless receiver before the electronic device enters a normal operating state; comparing the first identification data with a valid data; obtaining an account name and a password according to the first identification data if the first identification data matches the valid data and logging in to an operating system with the account name and the password so as for the electronic device to enter the normal operating state; and not logging in to the operating system if the first identification data does not match the valid data.

In another embodiment, an electronic device comprises a wireless receiver, a processing unit and an embedded controller. The embedded controller stores a valid data. The wireless receiver receives a first wireless signal. Before the processing unit enters a normal operating state, the embedded controller compares a first identification data with the valid data. When the first identification data matches the valid data, the embedded controller obtains an account name and a password according to the first identification data, and the processing unit logs in to an operating system with the account name and the password so as to enter a normal operating state. When the first identification data does not match the valid data, the processing unit does not log in to an operating system.

In conclusion, an electronic device and a method of starting the same according to the present invention uses an identification component which stores a specific identification data to enable the electronic device to log in to an operating system automatically. In some embodiments, after logging in to the operating system, the electronic device detects whether the identification component has left and thus determines whether to log out of the operating system and enter a sleep state.

DETAILED DESCRIPTION OF THE EMBODIMENTS

Figure 1:
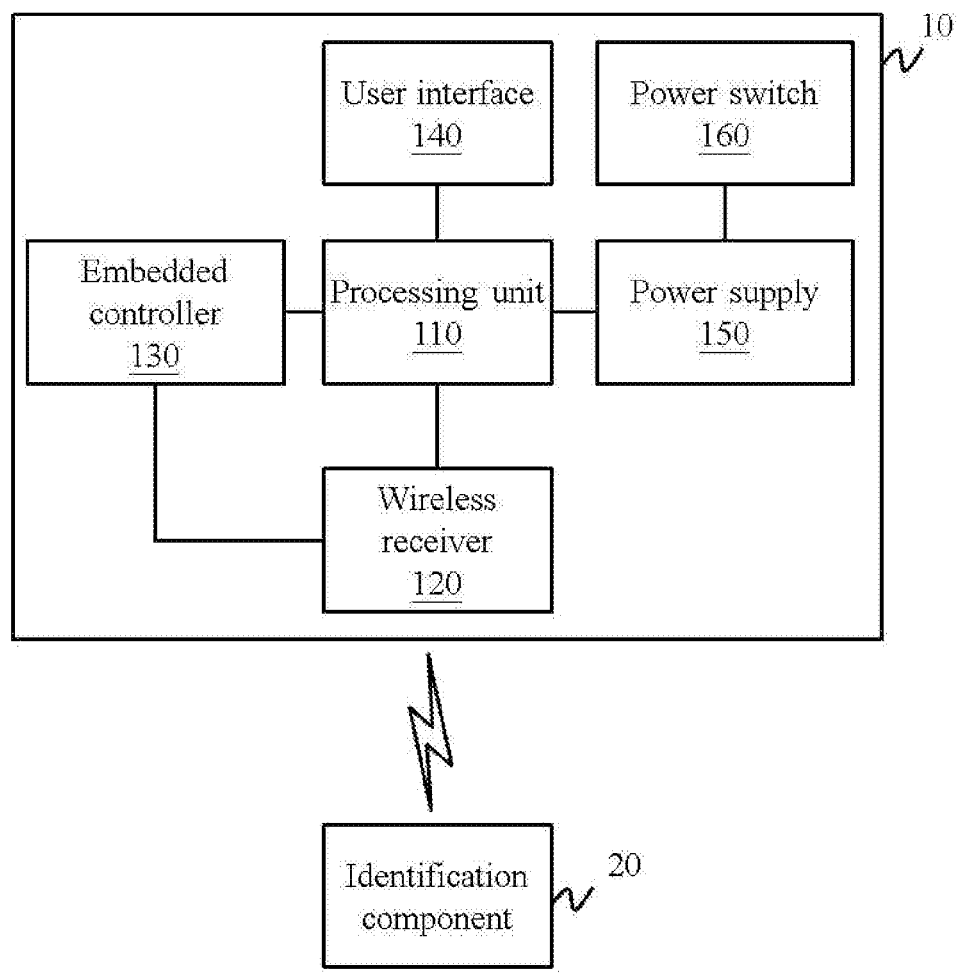
FIG. 1 is a function block diagram of an electronic device according to an embodiment of the present invention.

FIG. 1 is a function block diagram of an electronic device according to an embodiment of the present invention. Referring to FIG. 1, an electronic device 10 comprises a processing unit 110, a wireless receiver 120, an embedded controller 130 and a user interface 140. The processing unit 110 is coupled to the wireless receiver 120, the embedded controller 130 and the user interface 140. The embedded controller 130 stores valid data dedicated to one or more users, respectively. In an embodiment, the processing unit 110 executes a Basic Input/Output System (BIOS) to provide a setting interface whereby the users set dedicated valid data (the users enter the valid data to the setting interface, using the user interface 140.) In another embodiment, the processing unit 110 executes a start procedure of an operating system and provides a setting interface before logging in to the operating system so as to allow the users to set dedicated valid data (the users enter the valid data to the setting interface, using the user interface 140.) The valid data received by the setting interface is then stored in the embedded controller 130 by the processing unit 110. For illustrative sake, the description below is exemplified by a single user. The user has an identification component 20 which stores an identification data. The identification component 20 sends actively or passively a wireless signal which carries the identification data. The identification component 20 is an identity card or a wireless transmitter. The wireless transmitter is a Bluetooth (BT) transmitter, a radio-frequency identification (RFID) transmitter or near field communication (NFC).

Figure 2:
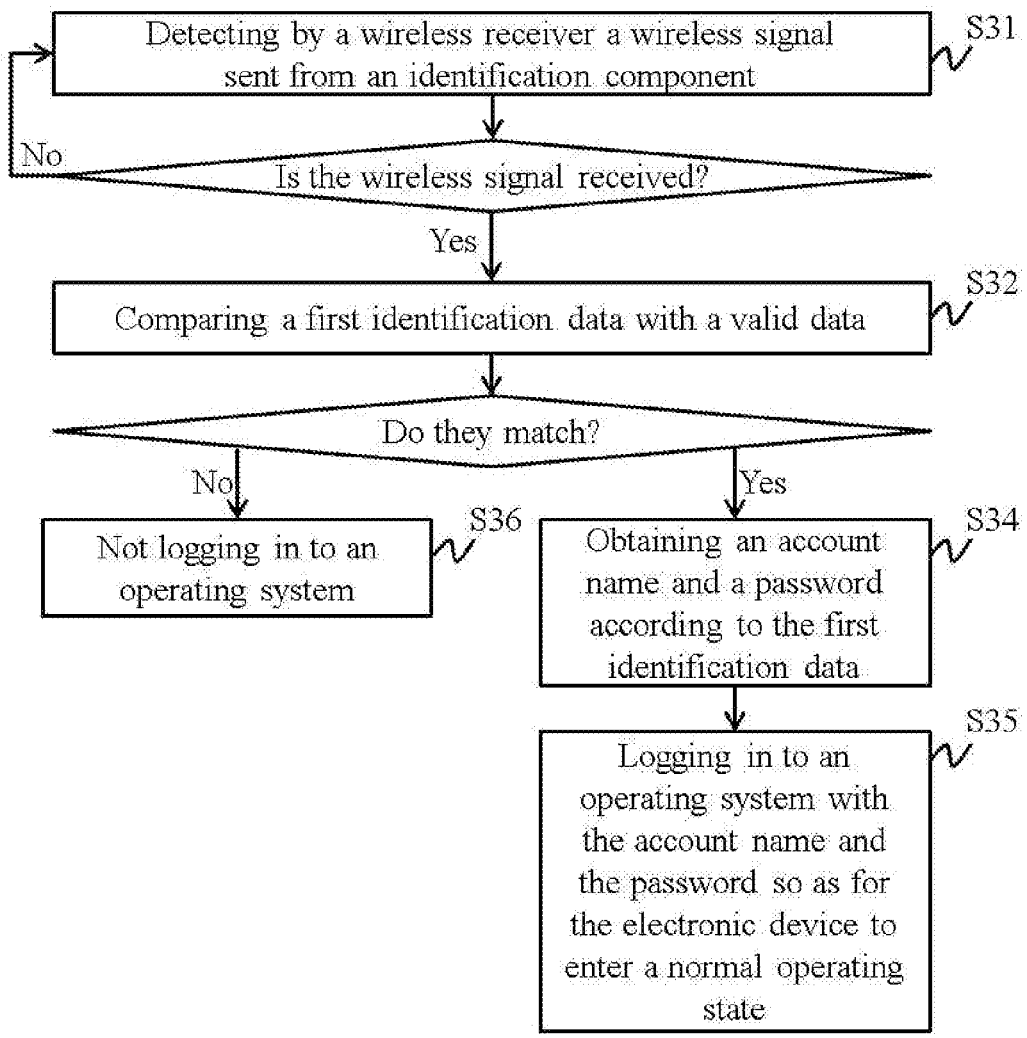
FIG. 2 is a flowchart of a method of starting an electronic device according to an embodiment of the present invention.

FIG. 2 is a flowchart of a method of starting an electronic device according to an embodiment of the present invention. Referring to FIG. 1 and FIG. 2, before the electronic device 10 logs in to the operating system and enters a normal operating state, the wireless receiver 120 detects a wireless signal sent from the identification component 20 (step S31) such that the embedded controller 130 determines whether the user approaches the electronic device 10.

As soon as the wireless receiver 120 receives a wireless signal (hereinafter referred to as the first wireless signal to facilitate recognition), the embedded controller 130 obtains an identification data (hereinafter referred to as the first identification data to facilitate recognition) in the first wireless signal and reads the valid data stored therein. Afterward, the embedded controller 130 compares the first identification data with the valid data (step S32) to confirm whether the first identification data matches the valid data. In an embodiment, the first identification data is an account name and a password, and the valid data is a preset, valid account number and valid password. Afterward, the embedded controller 130 compares and determines whether the account name matches the valid account number as well as compares and determines whether the password matches the valid password. When the account name matches the valid account number and the password matches the valid password, the embedded controller 130 determines that the first identification data matches the valid data. Conversely, when the account name does not match the valid account number and/or the password does not match the valid password, the embedded controller 130 determines that the first identification data does not match the valid data. In another embodiment, the first identification data is an account name, and the valid data is a preset valid account number; hence, the embedded controller 130 compares and determines whether the account name matches the valid account number. When the account name matches the valid account number, the embedded controller 130 determines that the first identification data matches the valid data. Conversely, when the account name does not match the valid account number, the embedded controller 130 determines that the first identification data does not match the valid data.

When the comparison result shows that the first identification data matches the valid data, the embedded controller 130 obtains an account name and a password according to the first identification data (step S34) and provides the obtained account name and password to the processing unit 110. After executing the start procedure of the operating system, the processing unit 110 logs in to the operating system with the account name and password to enable the electronic device 10 to enter a normal operating state (step S35). In an embodiment, the first identification data is an account name and a password. Therefore, the processing unit 110 logs in to the operating system directly with the first identification data. In another embodiment, the first identification data is an account name; meanwhile, the embedded controller 130 obtains a corresponding password in accordance with the account name and provides the account name and password to the processing unit 110. The password is stored in the embedded controller 130 or stored in a storage unit (not shown) outside the embedded controller 130.

Conversely, when the comparison result shows that the first identification data does not match the valid data, the processing unit 110 does not log in to the operating system (step S36). In an embodiment of step S36, the processing unit 110 executes the start procedure of the operating system and then keeps displaying the login frame of the operating system without logging in to the operating system. In another embodiment of step S36, the processing unit 110 does not execute the start procedure of the operating system but restores the initial state (for example, a shutdown state or a sleep state).

In some embodiments, after step S35, the embedded controller 130 executes an automatic sleep detecting procedure when the electronic device 10 is in the normal operating state.

Figure 3:
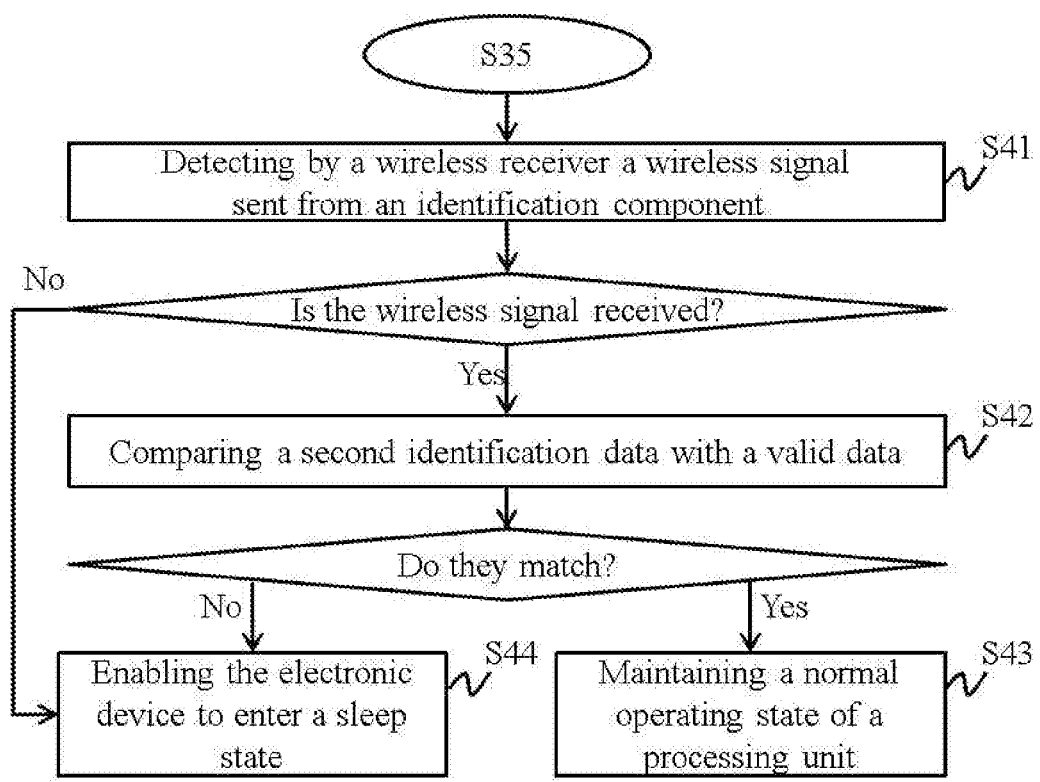
FIG. 3 is a partial flowchart of the method of starting an electronic device according to another embodiment of the present invention.

Referring to FIG. 3, in the automatic sleep detecting process, the wireless receiver 120 detects regularly a wireless signal sent from the identification component 20 (step S41) such that the embedded controller 130 determines whether the user has left the electronic device 10.

When the wireless receiver 120 receives a wireless signal (hereinafter referred to as the second wireless signal to facilitate recognition), the embedded controller 130 obtains an identification data (hereinafter referred to as the second identification data to facilitate recognition) in the second wireless signal and reads the valid data stored therein. Afterward, the embedded controller 130 compares the second identification data with the valid data (step S42) to confirm whether the second identification data matches the valid data. In an embodiment, when the second wireless signal and the previous first wireless signal are from the same identification component 20, the second identification data has the same content as the first identification data upon determination and login. At this point in time, the embedded controller 130 yields the comparison result that the second identification data matches the valid data. In another embodiment, when the second wireless signal and the previous first wireless signal are not from the same identification component 20, the second identification data has content different from the first identification data upon determination and login. At this point in time, the embedded controller 130 yields the comparison result that the second identification data does not match the valid data.

The embedded controller 130 maintains the normal operating state of the processing unit 110 when the comparison result shows that the second identification data matches the valid data (step S43).

When the comparison result shows that the second identification data does not match the valid data or the wireless receiver 120 does not detect the wireless signal, the embedded controller 130 causes the processing unit 110 to execute a sleep procedure, thereby enabling the electronic device 10 to enter a sleep state (step S44). When the processing unit 110 executes the sleep procedure, the processing unit 110 logs out of the operating system and enters a sleep state.

In an embodiment, before the electronic device 10 logs in to the operating system and enters the normal operating state (i.e., before step S31), the electronic device 10 is in the sleep state (i.e., the processing unit 110 is in the sleep state) but the wireless receiver 120 keeps operating normally. In an embodiment, when the electronic device 10 is in the sleep state, the embedded controller 130 keeps operating normally. In another embodiment, when the electronic device 10 is in the sleep state, the embedded controller 130 enters the sleep state but regularly wakes up to execute step S31.

In another embodiment, before the electronic device 10 logs in to the operating system and enters the normal operating state (i.e., before step S31), the electronic device 10 is in the sleep state (i.e., the processing unit 110 is in the sleep state) and the wireless receiver 120 is in the sleep state too. In an embodiment, when the electronic device 10 is in the sleep state, the embedded controller 130 keeps operating normally and regularly drives the wireless receiver 120 to execute step S31. In another embodiment, when the electronic device 10 is in the sleep state, the embedded controller 130 enters the sleep state but regularly wakes up to drive the wireless receiver 120 to execute step S31.

Figure 4:
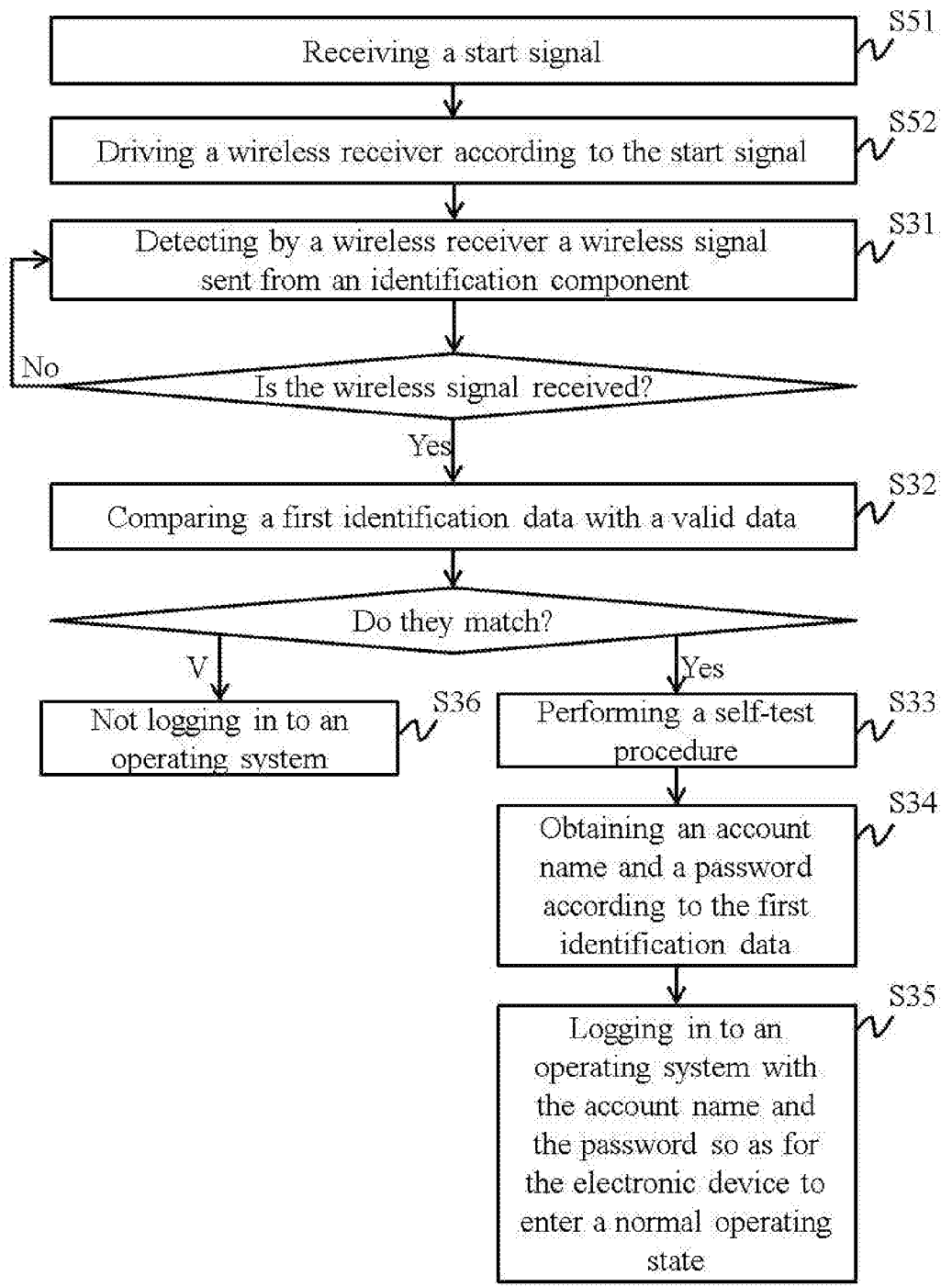
FIG. 4 is a flowchart of the method of starting an electronic device according to yet another embodiment of the present invention.

In yet another embodiment, before the electronic device 10 logs in to the operating system and enters the normal operating state (i.e., before step S31), the electronic device 10 is in a shutdown state. In step S36, the electronic device 10 shuts down. In an embodiment, the electronic device 10 further comprises a power supply 150 and a power switch 160. The power supply 150 is coupled to the processing unit 110 and the power switch 160. When the user presses the power switch 160, the power switch 160 causes the power supply 150 to supply power (i.e., a start signal) to the processing unit 110. When the processing unit 110 receives the start signal (step S51), the processing unit 110 drives the wireless receiver 120 (step S52) and keeps executing step S31. Before step S34, the processing unit 110 executes a self-test procedure (step S33). In an embodiment, step S33 is executed after the embedded controller 130 has yielded the comparison result that the first identification data matches the valid data but before step S34, as shown in FIG. 4. In another embodiment, step S33 is executed at any point in time after step S51 but before step S34.

In some embodiments, the electronic device 10 is a notebook computer, a cellular phone, a tablet, a desktop computer or a digital appliance.

In conclusion, an electronic device and a method of starting the same according to the present invention uses an identification component which stores a specific identification data to enable the electronic device to log in to an operating system automatically. In some embodiments, after logging in to the operating system, the electronic device detects whether the identification component has left and thus determines whether to log out of the operating system and enter a sleep state.

What is claimed is:

1. A method of starting an electronic device having a wireless receiver, an embedded controller and a processing unit, comprising the steps of:
   receiving, by the wireless receiver, a first wireless signal carrying a first identification data by the wireless receiver while the electronic device is in a sleep state;
   comparing, by the embedded controller, the first identification data with a valid data;
   determining that the first identification data matches the valid data;
   obtaining, by the embedded controller, an account name and a password according to the first identification data;
   providing, by the embedded controller, the account name and the password to the processing unit;
   executing, by the processing unit, the start procedure of an operating system upon receiving the account name and the password from the embedded controller; and
   logging in to the operating system, by the processing unit, with the account name and the password so as for the electronic device to enter the normal operating state.

2. The method of claim 1, wherein the first wireless signal is from one of an identity card and a wireless transmitter.

3. The method of claim 1, wherein the method further comprises:
   driving the wireless receiver while the electronic device is in the sleep state.

4. The method of claim 1, wherein, when the first identification data matches the valid data, the step of logging in to the operating system with the account name and the password is preceded by executing a self-test procedure.

5. The method of claim 1, wherein the first identification data is the account name and the password.

6. The method of claim 1, wherein the first identification data is a username.

7. The method of claim 1, further comprising the steps of:
   executing an automatic sleep detecting procedure when the electronic device is in the normal operating state, the automatic sleep detecting procedure comprising the steps of:
   detecting a second wireless signal regularly by the wireless receiver, wherein the second wireless signal comprises a second identification data;
   comparing the second identification data with the valid data upon detection of the second wireless signal;
   keeping the electronic device in the normal operating state when the second identification data matches the valid data; and
   causing the electronic device to enter a sleep state when the second wireless signal is not detected or the second identification data does not match the valid data.

8. The method of claim 1, wherein the embedded controller periodically drives the wireless receiver to receive wireless signals while the electronic device is in the sleep state.

9. The method of claim 1, wherein the embedded controller enters the sleep state when the electronic device is in the sleep state, and periodically wakes up to drive the wireless receiver to receive wireless signals while the electronic device is in a sleep state.

10. An electronic device, comprising:
    a wireless receiver configured to receive a first wireless signal while the electronic device is in a sleep state, wherein the first wireless signal comprises a first identification data;
    a processing unit; and
    an embedded controller storing a valid data, configured to perform the following while the electronic device is in the sleep state:
    compare the first identification data with the valid data; and
    when the first identification data matches the valid data:
       obtain an account name and a password according to the first identification data; and
       provide the account name and the password to the processing unit; and
    wherein the processing unit is configured to perform the following:
       execute the start procedure of an operating system upon receiving the account name and the password from the embedded controller while the electronic device is in the sleep state; and
       log in to the operating system with the account name and the password so as to enter the normal operating state.

11. The electronic device of claim 10, wherein the first wireless signal is from one of an identity card and a wireless transmitter.

12. The electronic device of claim 10, wherein the wireless receiver is configured to keep operating normally in the sleep state.

13. The electronic device of claim 10, wherein the first identification data is the account name and the password.

14. The electronic device of claim 10, wherein the first identification data is a username.

15. The electronic device of claim 10, wherein, when the processing unit is in the normal operating state, the embedded controller executes an automatic sleep detecting procedure, and the automatic sleep detecting procedure comprises:
    detecting a second wireless signal regularly by the wireless receiver, wherein the second wireless signal comprises a second identification data;
    comparing the second identification data with the valid data upon detection of the second wireless signal;
    maintaining the normal operating state of the processing unit when the second identification data matches the valid data; and
    causing the processing unit to execute a sleep procedure when the second wireless signal is not detected or the second identification data does not match the valid data.

16. The electronic device of claim 10, wherein the embedded controller is configured to periodically drive the wireless receiver to receive wireless signals while the electronic device is in the sleep state.

17. The electronic device of claim 10, wherein the embedded controller is configured to enter the sleep state when the electronic device is in the sleep state, and periodically wake up to drive the wireless receiver to receive wireless signals while the electronic device is in a sleep state.

* * * * *